US011566713B2

(12) United States Patent
Poremski et al.

(10) Patent No.: US 11,566,713 B2
(45) Date of Patent: Jan. 31, 2023

(54) VALVE SEAT ASSEMBLY HAVING MATING SURFACES WITH A REVERSE TAPER ANGLE

(71) Applicant: Kennametal Inc., Latrobe, PA (US)

(72) Inventors: Jacob Poremski, Apollo, PA (US); Carrie Bartkowiak, Traverse City, MI (US); John Brosnahan, North Huntingdon, PA (US); Thomas J. Long, II, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 85 days.

(21) Appl. No.: 17/226,964

(22) Filed: Apr. 9, 2021

(65) Prior Publication Data

US 2022/0325803 A1 Oct. 13, 2022

(51) Int. Cl.
*F16K 1/42* (2006.01)
*F16K 3/12* (2006.01)
*F16K 1/46* (2006.01)

(52) U.S. Cl.
CPC .................. *F16K 3/12* (2013.01); *F16K 1/42* (2013.01); *F16K 1/465* (2013.01)

(58) Field of Classification Search
CPC .................................. F16K 1/465; F16K 1/42
USPC ................................. 251/332–334, 359–365
See application file for complete search history.

(56) References Cited

U.S. PATENT DOCUMENTS

| | | | | |
|---|---|---|---|---|
| 2,898,082 | A * | 8/1959 | Von Almen ......... | F04B 53/1027 251/360 |
| 2,969,951 | A | 1/1961 | Walton | |
| 3,063,467 | A | 11/1962 | Roberts, Jr. et al. | |
| 3,324,880 | A | 6/1967 | Roberts et al. | |
| 5,249,600 | A | 10/1993 | Blume | |
| 5,345,965 | A | 9/1994 | Blume | |
| 7,070,166 | B1 | 7/2006 | Blume | |
| D700,682 | S | 3/2014 | Bayyouk et al. | |
| 9,631,739 | B2 | 4/2017 | Belshan et al. | |
| 9,822,894 | B2 | 11/2017 | Bayyouk et al. | |
| 10,344,757 | B1 | 7/2019 | Stark et al. | |
| D880,661 | S | 4/2020 | Foster et al. | |

(Continued)

FOREIGN PATENT DOCUMENTS

| | | | |
|---|---|---|---|
| DE | 1236290 | B | 3/1967 |
| GB | 855956 | A | 12/1960 |

(Continued)

*Primary Examiner* — John Bastianelli
(74) *Attorney, Agent, or Firm* — Larry R. Meenan

(57) ABSTRACT

A valve seat assembly includes a body having an insert pocket with an axially extending inner surface and a radially extending bottom surface. The valve seat further includes an insert disposed within the insert pocket of the body. The insert includes an axially extending outer surface and a radially extending bottom surface for mating with the axially extending inner surface and a radially extending bottom surface of the insert pocket of the body. The axially extending inner surface of the body is formed with a non-zero reverse taper angle, $A_4$, for securing the insert within the insert pocket of the body. The axially extending outer surface of the insert is formed with a reverse taper angle, $A_5$, equal to or greater than zero degrees. A valve assembly includes a valve and the valve seat assembly in reciprocating contact with the valve.

19 Claims, 7 Drawing Sheets

(56) References Cited

U.S. PATENT DOCUMENTS

| | | | | |
|---|---|---|---|---|
| 10,718,441 | B2 | 7/2020 | Myers et al. | |
| 10,851,775 | B2 | 12/2020 | Stark et al. | |
| 2011/0079302 | A1 | 4/2011 | Hawes | |
| 2013/0020521 | A1 | 1/2013 | Byrne | |
| 2013/0202457 | A1 | 8/2013 | Bayyouk et al. | |
| 2013/0202458 | A1 | 8/2013 | Byrne et al. | |
| 2015/0144826 | A1* | 5/2015 | Bayyouk | F04B 53/1087 251/359 |
| 2016/0215588 | A1 | 7/2016 | Belshan et al. | |
| 2016/0312903 | A1 | 10/2016 | Dille | |
| 2017/0002947 | A1 | 1/2017 | Bayyouk et al. | |
| 2017/0298932 | A1 | 10/2017 | Wagner et al. | |
| 2019/0040966 | A1* | 2/2019 | Myers | F16K 15/026 |
| 2019/0063427 | A1 | 2/2019 | Nowell et al. | |
| 2019/0120389 | A1 | 4/2019 | Foster et al. | |
| 2019/0368619 | A1 | 12/2019 | Barnett et al. | |
| 2020/0072368 | A1 | 3/2020 | Singley et al. | |
| 2020/0191286 | A1 | 6/2020 | Iannetti | |
| 2021/0017982 | A1 | 1/2021 | Bayyouk et al. | |

FOREIGN PATENT DOCUMENTS

| | | | |
|---|---|---|---|
| NL | 1020775 | C2 | 12/2003 |
| RU | 2442923 | C2 | 2/2012 |
| RU | 170561 | U1 | 4/2017 |
| RU | 181151 | U1 | 7/2018 |
| RU | 181157 | U1 | 7/2018 |
| WO | WO2015077001 | A1 | 5/2015 |
| WO | WO2016201020 | A1 | 12/2016 |
| WO | WO2019213622 | A2 | 11/2019 |
| WO | WO2019236960 | A1 | 12/2019 |

* cited by examiner

VALVE SEAT ASSEMBLY HAVING MATING SURFACES WITH A REVERSE TAPER ANGLE

FIELD OF THE DISCLOSURE

In general, the invention relates to a valve assembly for fluid end application and, in particular, to a valve seat assembly for a valve assembly having mating surfaces between the body and the insert formed with a reverse taper angle.

BACKGROUND OF THE DISCLOSURE

Valves and associated valve assemblies play a critical role in fluid ends of high-pressure pumps incorporating positive displacement pistons in multiple cylinders. A fluid end comprises a suction fluid passageway and a discharge fluid passageway. A valve assembly is positioned in the suction fluid passageway and/or the discharge fluid passageway. Typically, the valve assembly includes a valve in reciprocating contact with a valve seat that is inserted into the suction fluid passageway and/or the discharge fluid passageway.

Operating environments of the valves are often severe due to high pressures and cyclical impact between the valve body and the valve seat. These severe operating conditions can induce premature failure and/or loss of seal of the valve assembly. Moreover, fluid passing through the fluid end and contacting the valve assembly can include high levels of particulate matter from hydraulic fracturing operations.

In hydraulic fracturing, a particulate slurry is employed to maintain crack openings in the geological formation after hydraulic pressure from the well is released. In some applications, alumina particles are employed in the slurry due to higher compressive strength of alumina relative to silica particles or sand. The particulate slurry can impart significant wear on contact surfaces of the valve and valve seat. In addition, slurry particles can become trapped in the valve sealing cycle, resulting in further performance degradation of the valve assembly.

In view of these problems, valve seats have been fabricated from a variety of hard and wear resistant materials, including cemented carbide. While exhibiting high hardness and wear resistance, carbide valve seats can undergo occasional catastrophic failure due to stresses induced in the carbide from handling during transportation, installation forces during the press fit with the fluid end, application forces, and removal forces.

SUMMARY OF THE DISCLOSURE

The problem of preventing mating surface separation encountered by a valve seat during installation and operation in fluid ends can be solved by providing a reverse taper on the mating surfaces between the housing or body and the inlay or insert of the valve seat.

In one aspect, a valve assembly comprises a valve and a valve seat assembly in reciprocating contact with the valve. The valve seat assembly comprises a body having an insert pocket comprising an axially extending inner surface and a radially extending bottom surface. The valve seat assembly further comprises an insert disposed within the insert pocket of the body. The insert includes an axially extending outer surface and a radially extending bottom surface for mating with the axially extending inner surface and a radially extending bottom surface of the body. The axially extending inner surface of the body is formed with a non-zero reverse taper angle, $A_4$.

In another aspect, a valve seat assembly for a valve assembly comprises a body having an insert pocket comprising an axially extending inner surface and a radially extending bottom surface. The valve seat assembly further comprises an insert disposed within the insert pocket of the body. The insert includes an axially extending outer surface and a radially extending bottom surface for mating with the axially extending inner surface and a radially extending bottom surface of the body. The axially extending inner surface of the body is formed with a non-zero reverse taper angle, $A_4$.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION

Figure 1:
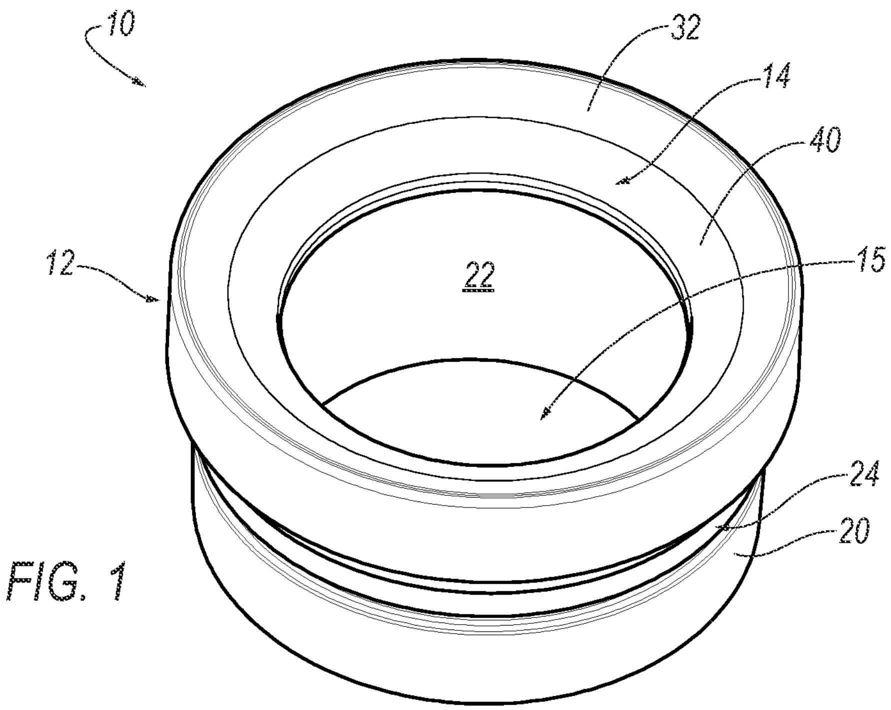
FIG. 1 is a perspective view of a valve seat with the mating surfaces between the body and the inlay having a reverse taper according to an embodiment of the invention.
Figure 2:
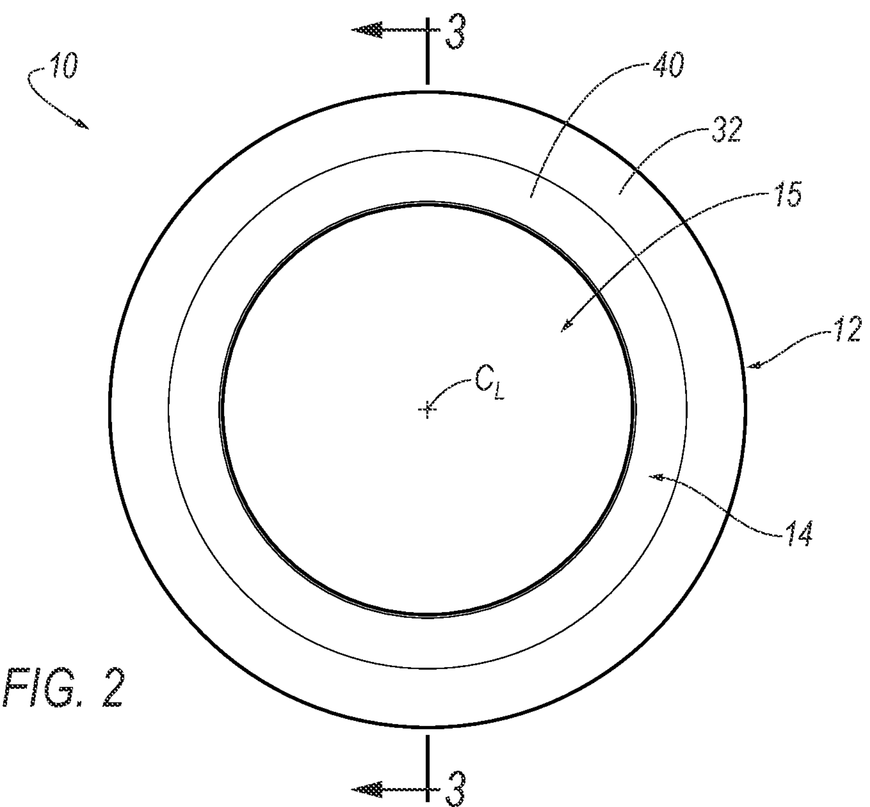
FIG. 2 is a top view of the valve seat of FIG. 1.

Referring now to FIGS. 1-8, a valve seat assembly 10 for fluid end applications is shown according to an embodiment of the invention. In general, the valve seat assembly 10 comprises two main components: a housing or body 12 and an inlay or insert 14 fixedly attached to the body 12. The valve seat assembly 10 includes a central bore 15 to allow fluid to pass therethrough.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this invention pertains.

For purposes of this specification (other than in the operating examples), unless otherwise indicated, all numbers expressing quantities and ranges of ingredients, process conditions, etc., are to be understood as modified in all instances by the term "about". Accordingly, unless indicated to the contrary, the numerical parameters set forth in this specification and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the phrase "axially extending" is defined as extending in a direction along the vertical axis (i.e., the central, longitudinal axis).

As used herein, the phrase "radially extending" is defined as extending in a direction along the horizontal axis or substantially perpendicular to the vertical axis (i.e., perpendicular to the central, longitudinal axis).

As used herein, the term "frustoconical" is defined as an object having a shape of a frustum of a cone. The frustum is the basal part of a solid cone or pyramid forming by cutting off the top by a plane parallel to the base.

As used herein, the phrase "reverse taper angle" is defined as the angle formed between a vertical axis and a surface of an object. For example, an inner surface of the body can define a reverse taper angle with respect to the central, longitudinal axis of the valve seat. In another example, an outer surface of the insert can define a reverse taper angle with respect to the central, longitudinal axis of the valve seat.

Figure 3:
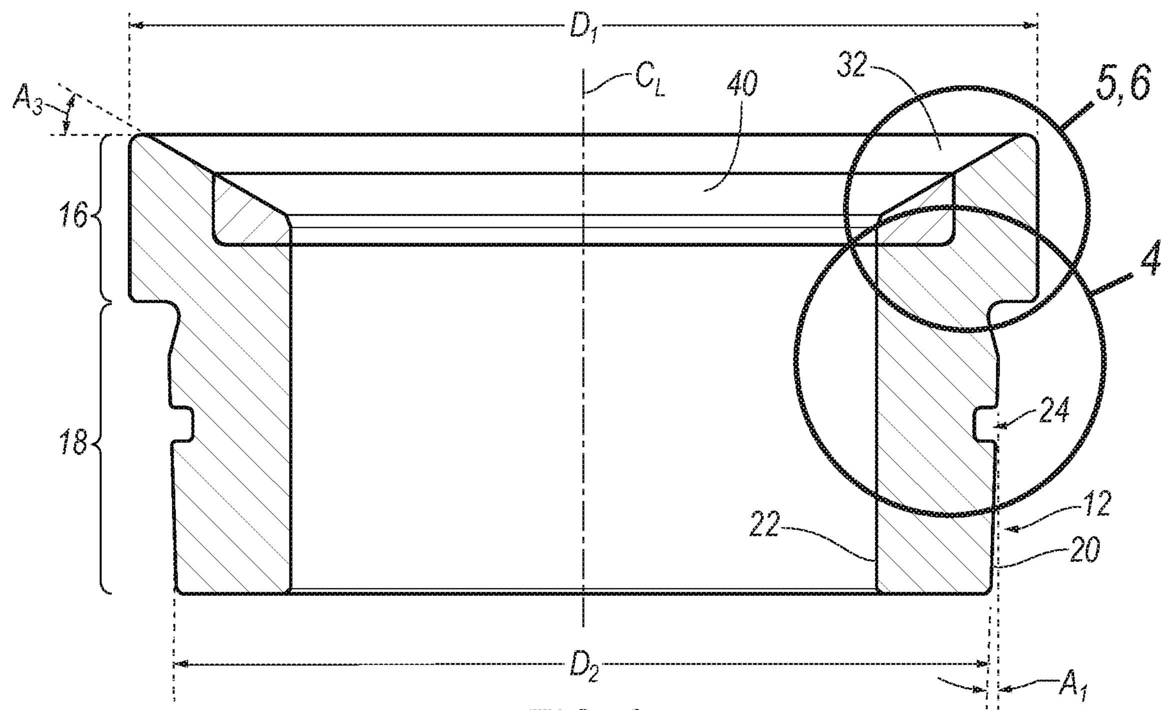
FIG. 3 is a cross-sectional view of the valve seat taken along line 3-3 of FIG. 2.

As shown in FIG. 3, the body 12 has a first portion 16 and a second portion 18 extending longitudinally from the first portion 16 and capable of being inserted into a fluid passageway of a fluid end (not shown).

The second portion 18 of the body 12 includes an outer surface 20 formed at a taper angle, $A_1$, with respect to a central, longitudinal axis, $C_L$, (or vertical axis) of the valve seat assembly 10. In one embodiment, the taper angle, $A_1$, can be in a range between about 0.1 degrees to about 10.0 degrees. The body 12 also includes an inner surface 22 that is generally parallel to the central, longitudinal axis, $C_L$, of the valve seat assembly 10. In some embodiments, the inner surface 22 may also be tapered, similar to the outer surface 20. The tapered outer surface 20 provides for a variable second outer diameter, $D_2$, of the second portion 18 of the body 12. In an alternate embodiment, the outer surface 20 of the second portion 12 is not tapered, but remains substantially parallel with respect to the central, longitudinal axis, $C_L$. In such an embodiment, the outer surface 20 of the second portion 12 has a constant second outer diameter, $D_2$. The outer surface 20 of the second portion 18 may also include one or more recesses 24 for receiving a sealing member 204 (FIG. 10), such as an O-ring, and the like, for sealing between the valve seat assembly 10 and a fluid passageway wall (not shown).

In the embodiment shown in FIG. 3, the first portion 16 has a first outer diameter, $D_1$, that is greater in magnitude than the second outer diameter, $D_2$, of the second portion 18. As a result, the larger outer diameter, $D_1$, of the first portion 16 forms a shoulder 26 proximate the second portion 18. The shoulder 26 has a radially extending shoulder surface **26*a* that is generally normal to the central, longitudinal axis, $C_L$, of the valve seat assembly 10. In other embodiments, the shoulder surface 26*a* can taper and/or form an angle with respect to the central, longitudinal axis, $C_L$, having a magnitude in the range between about 5 degrees and about 90 degrees. The design of the shoulder 26 can be selected according to several considerations including, but not limited to, entrance geometry of the fluid passageway and pressures experienced by the valve seat assembly 10 when in operation. In some embodiments, for example, the taper of the shoulder 26 can be selected according to curvature of the fluid passageway entrance engaging the shoulder 26**.

Figure 4:
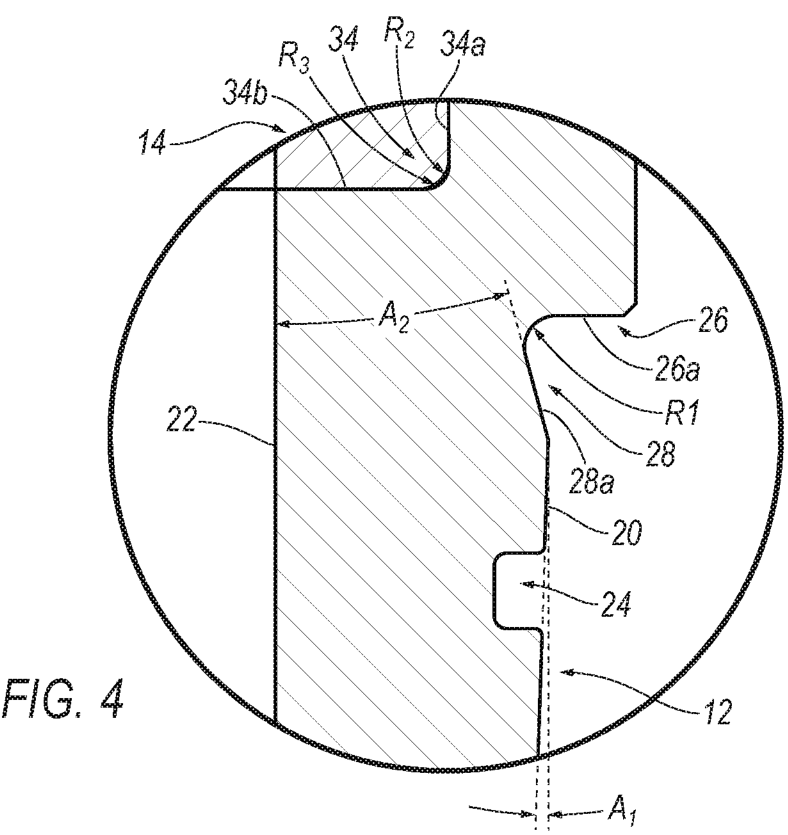
FIG. 4 is an enlarged view a portion of the body and the inlay of the valve seat of FIG. 3.

As shown in FIG. 4, the second portion 18 of the body 12 includes an undercut 28 that is formed in the outer surface 20 proximate the shoulder 26 of the first portion 16. The undercut 28 is in the form of a chamfered surface 28*a* formed at an angle, $A_2$, with respect to the central, longitudinal axis, $C_L$, of the valve seat assembly 10. In one embodiment, the angle, $A_2$, is in the range between about 5 degrees and about 45 degrees with respect to the central, longitudinal axis, $C_L$, of the valve seat assembly 10. For example, the angle, $A_2$, can be about 15 degrees. The undercut 28 of the second portion 18 transitions to the first portion 16 at a radius blend 30 formed with a radius, $R_1$. The radius blend 30 can have any desired radius, $R_1$. For example, the radius, $R_1$, of the radius blend 30, can be about 0.05 to about 0.80 times the width of the shoulder 26. In one embodiment, the radius, $R_1$, is about 0.08 inches. Although the purpose of the undercut 28 and the radius blend 30 is to provide clearance between the valve seat assembly 10 and the fluid passageway of the fluid end (not shown), the radius blend 30 can be omitted.

Figure 5:
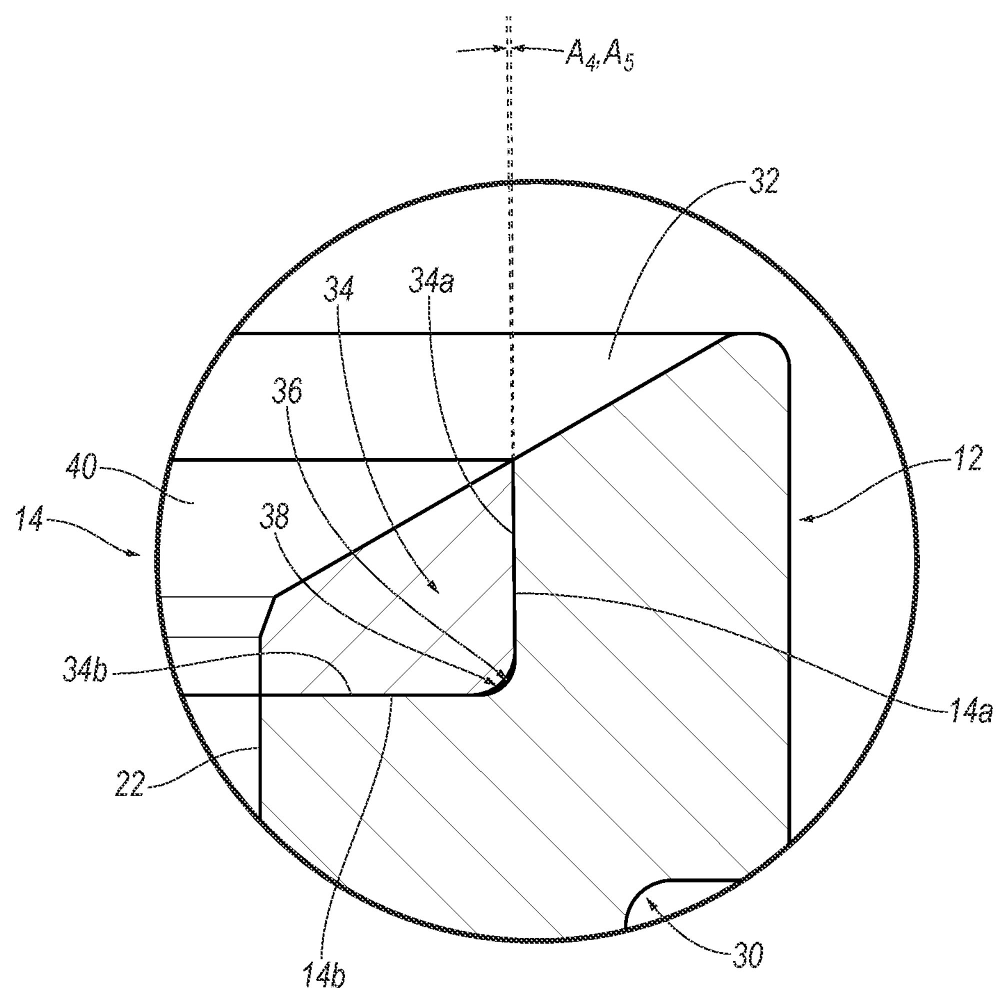
FIG. 5 is an enlarged view of the axially extending inner surface of the body and the axially extending outer surface of the insert with the same reverse taper angle according to an aspect of the invention.

As shown in FIGS. 3 and 5, the first portion 16 also comprises a frustoconical valve mating surface 32 formed at an angle, $A_3$, which respect to a plane substantially perpendicular to the central, longitudinal axis, $C_L$, of the valve seat assembly 10. The angle, $A_3$, can be in the range between about 15 degrees and about 45 degrees. For example, in one embodiment, the angle, $A_3$, is about 30 degrees.

Figure 6:
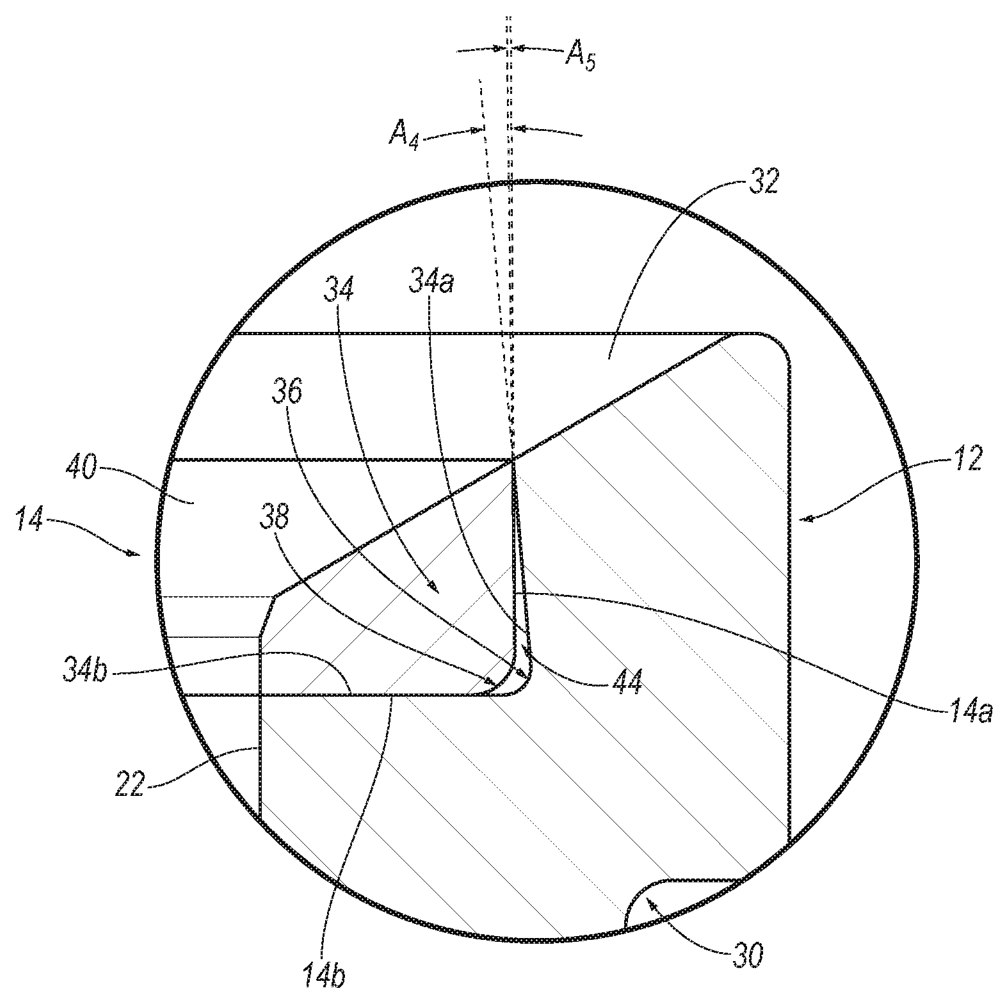
FIG. 6 is an enlarged view of the axially extending inner surface of the body and the axially extending outer surface of the insert with different reverse taper angles according to an aspect of the invention.
Figure 7:
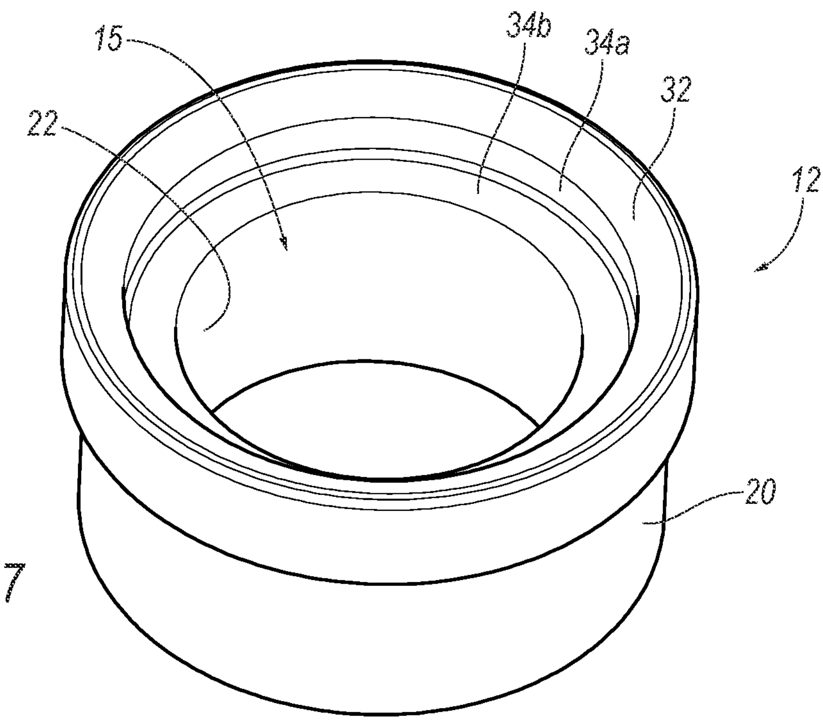
FIG. 7 is a perspective view of the housing or body according to an embodiment of the invention.
Figure 8:
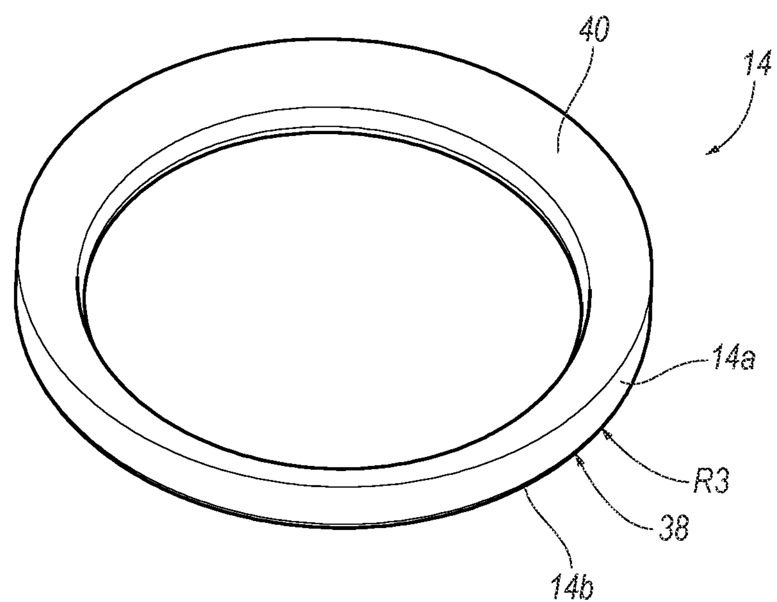
FIG. 8 is a perspective view of the inlay or insert according to an embodiment of the invention.

As shown in FIGS. 4-6, the first portion 16 of the body 12 also includes an insert pocket 34 having an axially extending inner surface 34*a* and a radially extending bottom surface 34*b* for mating with an axially extending outer surface 14*a* and a radially extending bottom surface 14*b* of the insert 14. As shown in FIGS. 5 and 6, the transition between the side surface 34*a* and the radially extending bottom surface 34*b* of the first portion 16 of the body 12 may be formed with a radius blend 36 having a radius, $R_2$. Likewise, the transition between the side surface 14*a* and the radially extending bottom surface 14*b* of the insert 14 may be formed with a radius blend 38 having a radius, $R_3$, as shown in FIGS. 5 and 7. The purpose of the radius blends 36, 38 is to provide clearance between the body 12 and the insert 14. In one embodiment, the radius, $R_2$, of the body 12 is slightly less in magnitude than the radius, $R_3$, of the insert 14. For example, the radius, $R_2$, of the body 12 may be about 0.060 inches, and the radius, $R_3$, of the insert 14 may be about 0.075 inches. In an alternate embodiment, the radius blend 36 of the body 12 can be omitted. In another embodiment, the radius blend 38 of the insert 14 is replaced with a chamfered surface (not shown). In yet another embodiment, the radius blend 36 of the body 12 can be omitted.

As shown in FIGS. 5 and 6, one aspect of the invention is that the axially extending inner surface 34*a* of the body 12 is formed with a reverse taper angle, $A_4$, and the axially extending outer surface 14*a* of the insert 14 is formed with a reverse taper angle, $A_5$.

As described above, the reverse taper angle, in general, is defined as the angle formed between a vertical axis and a surface of an object. In the illustrated embodiment, the reverse taper angle, $A_4$, is measured as the difference in distance from the central, longitudinal axis, $C_L$, to the top of the axially extending inner surface 34*a* of the pocket 34 and the bottom of the axially extending inner surface 34*a* of the pocket 34 of the body 12 (i.e., the difference in radii between the top and bottom of the axially extending inner surface 34*a* of the pocket 34). Because the radius at the bottom of the axially extending inner surface 34*a* of the pocket 34 is larger than the radius at the top of the axially extending inner surface 34*a* of the pocket 34, the reverse taper angle, $A_4$, is created. In other words, the axially extending inner surface 34*a* is not parallel to the central, longitudinal axis, $C_L$, of the valve seat assembly 10.

The reverse taper angle, $A_4$, can have any magnitude greater than zero degrees. In other words, the reverse taper angle, $A_4$, is a positive, non-zero value.

Similar to the reverse taper angle, $A_4$, the reverse taper angle, $A_5$, is measured as the difference in distance from the central, longitudinal axis, $C_L$, to the top of the axially extending outer surface 14*a* of the insert 14 and the bottom of the axially extending outer surface 14*a* of the insert 14 (i.e., the difference in radii between the top and bottom of the axially extending outer surface 14*a* of the pocket 14). However, unlike the reverse taper angle, $A_4$, of the axially extending inner surface 34*a* of the pocket 34 of the body 12, the reverse taper angle, $A_5$, of the axially extending outer surface 14*a* of the insert 14 can be zero degrees in magnitude or can have any magnitude greater than zero degrees. Thus, the reverse taper angle, $A_5$, of the axially extending outer surface 14*a* of the insert 14 may be equal or different in magnitude than the reverse taper angle, $A_4$, of the axially extending inner surface 34*a* of the pocket 34 of the body 12.

As shown in FIG. 5, for example, the reverse taper angle, $A_4$, of the axially extending inner surface 34*a* of the pocket 34 of the body 12 is equal to the reverse taper angle, $A_5$, of the axially extending outer surface 14*a* of the insert 14. In addition, both reverse taper angles, $A_4$, $A_5$, are non-zero in magnitude.

As shown in FIG. 6, for example, the reverse taper angle, $A_4$, of the axially extending inner surface 34*a* of the pocket 34 of the body 12 is different in magnitude than the reverse taper angle, $A_5$, of the axially extending outer surface 14*a* of the insert 14. Specifically, the reverse taper angle, $A_4$, is greater in magnitude than the reverse taper angle, $A_5$. As a result of this difference in magnitude, a gap 44 may exist between the axially extending inner surface 34*a* of the body 12 and the axially extending outer surface 14*a* of the insert 14. The gap 44 has the greatest distance proximate the radially extending bottom surface 14*b* of the insert 14 and the radially extending bottom surface 34*b* of the body 12 (i.e. the bottom of the pocket 34), thereby causing the maximum stress concentration to be located at the top of the axially extending inner surface 34*a* of the pocket 34.

Referring now to FIGS. 1-3, 5, 6 and 8, the insert 14 also comprises a frustoconical valve mating surface 40 that is also formed at the angle, $A_3$, which respect to a plane substantially perpendicular to the central, longitudinal axis, $C_L$, of the valve seat assembly 10. Similar to the mating surface 32 of the body 12, the angle, $A_3$, can be in the range between about 15 degrees and about 45 degrees. For example, in one embodiment, the angle, $A_3$, is about 30 degrees.

The body 12 and the insert 14 can be made any suitable wear resistant material. The body 12 and the insert 14 can be made of the same material or a different material. For example, the body 12 can be made of a steel, steel alloy, and the like. In another example, the body 12 can be made of a single grade of sintered cemented carbide. In other example, one or more compositional gradients can exist between sintered cemented carbide of the first portion 16 and the second portion 18 of the body 12. For example, sintered cemented carbide of the second portion 18 may have larger average grain size and/or higher metallic binder content to increase toughness. In contrast, sintered cemented carbide of the first portion 16 may have smaller average grain size and less binder for enhancing hardness and wear resistance. Additionally, a compositional gradient can exist within the first and/or second portions 16, 18. In some embodiments, sintered cemented carbide forming the valve mating surface 32 of the first portion 16 comprises small average grain size and lower metallic binder content for enhancing hardness and wear resistance. Progressing away from the valve mating surface 32, the sintered cemented carbide composition of the first portion 16 can increase in grain size and/or binder content to enhance toughness and fracture resistance. In some embodiments, for example, sintered cemented carbide of high hardness and high wear resistance can extend to a desired depth in the first portion 16. Once the desired depth is reached, the sintered cemented carbide composition can change to a tougher, fracture resistant composition.

The insert 14 can be made of a sintered carbide material with the addition of tungsten carbide (WC) for additional wear resistant material properties. Tungsten carbide can be present in the sintered carbide in an amount of at least 70 weight percent or in an amount of at least 80 weight percent. Additionally, metallic binder of cemented carbide can comprise cobalt or cobalt alloy. Cobalt, for example, can be present in the sintered cemented carbide in an amount ranging from 3 weight percent to 20 weight percent. In some embodiments, cobalt is present in sintered cemented carbide of the valve seat in an amount ranging from 5-12 weight percent or from 6-10 weight percent. Further, sintered cemented carbide valve seat may exhibit a zone of binder enrichment beginning at and extending inwardly from the surface of the substrate. Sintered cemented carbide of the valve seat can also comprise one or more additives such as, for example, one or more of the following elements and/or their compounds: titanium, niobium, vanadium, tantalum, chromium, zirconium and/or hafnium. In some embodiments, titanium, niobium, vanadium, tantalum, chromium, zirconium and/or hafnium form solid solution carbides with WC of the sintered cemented carbide. In such embodiments, the sintered carbide can comprise one or more solid solution carbides in an amount ranging from 0.1-5.0 weight percent.

Figure 9:
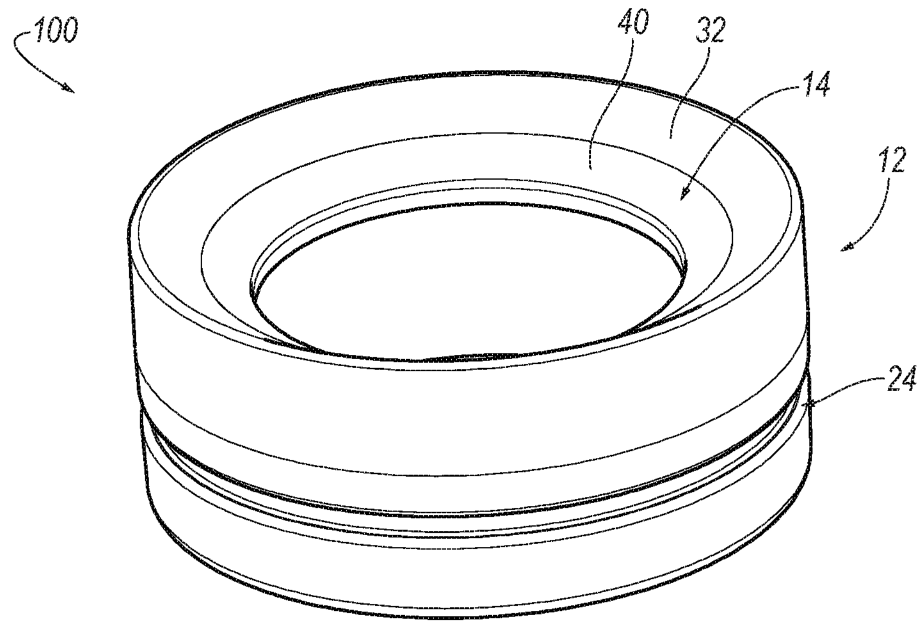
FIG. 9 is a perspective view of a valve seat comprising a single outer diameter according to another embodiment of the invention.
Figure 10:
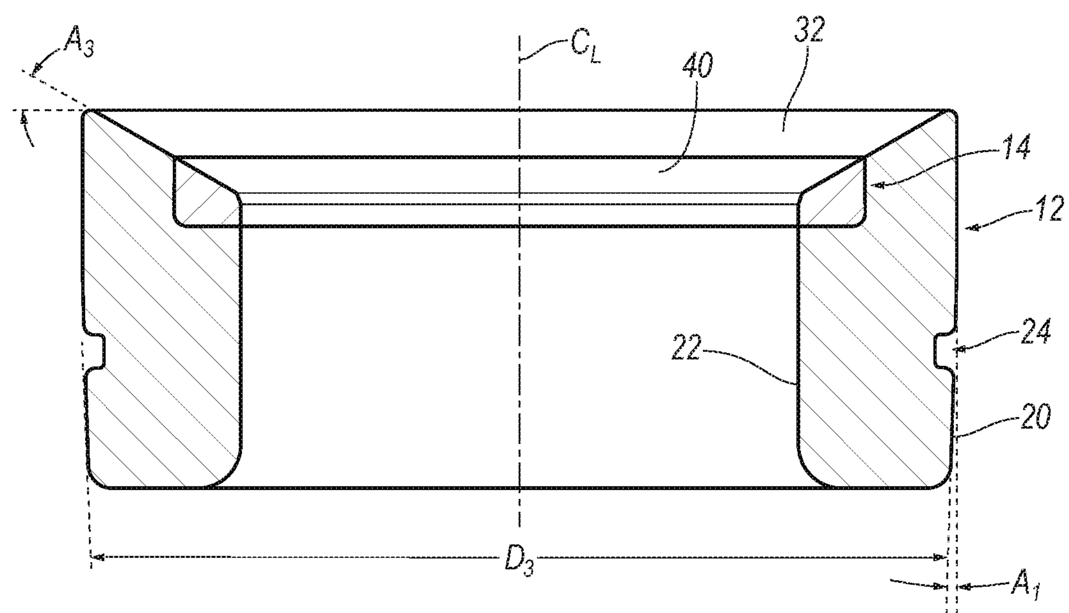
FIG. 10 is a cross-sectional view of the valve seat of FIG. 9.

As described above, the first and second portions 16, 18 of the valve seat assembly 10 have different outer diameters, $D_1$, $D_2$. Referring now to FIGS. 9 and 10, a valve seat assembly 100 is shown according to an alternate embodiment of the invention. The reference numerals in FIGS. 9 and 10 correspond to the same components as in FIGS. 1-8.

As shown in FIGS. 9 and 10, the first and second portions 16, 18 of the valve seat assembly 100 are eliminated and the valve seat assembly 100 comprises a single outer diameter, $D_3$. In addition, the shoulder 26 is eliminated in the valve seat assembly 100. Similar to the embodiment of the valve seat assembly 10, the outer diameter of the valve seat may taper inwardly in a direction away from the valve mating surfaces 32, 40 at an angle, $A_1$. Thus, the first portion 16 of the valve seat assembly 100 may have a larger outer diameter than the second portion 18.

Figure 11:
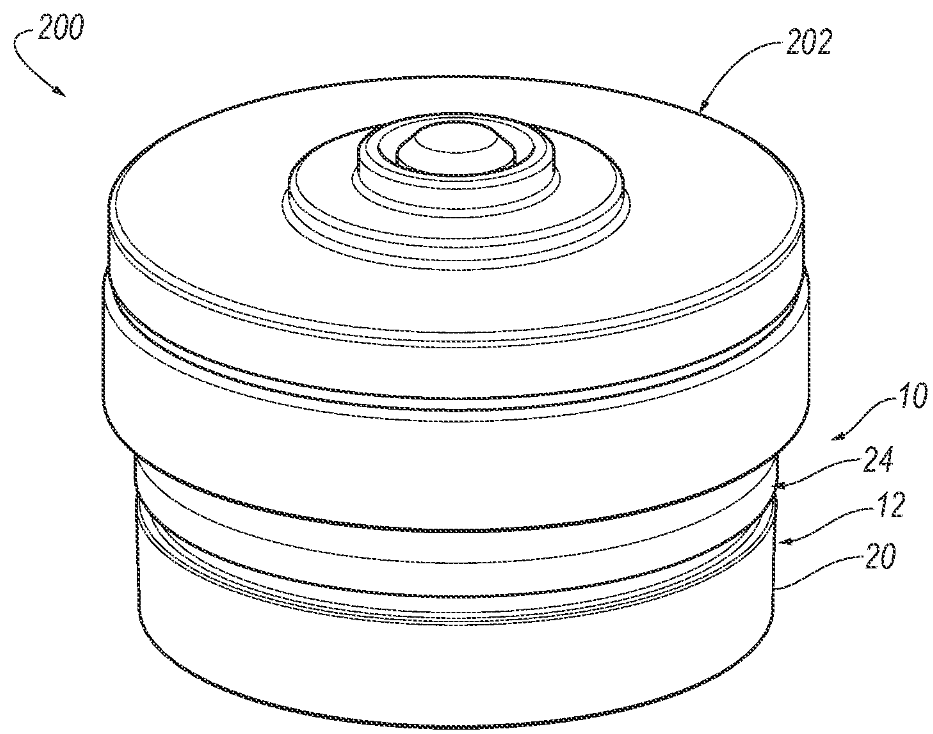
FIG. 11 is a perspective view of a valve assembly comprising a valve in reciprocating contact with the valve seat of FIG. 1 according to an embodiment of the invention.

Referring now to FIG. 11, a valve assembly 200 is shown according to an embodiment of the invention. The valve assembly 200 includes a valve 202 in reciprocating contact with the valve seat assembly 10. Note that the insert 14 of the valve seat assembly 10 is not visible in FIG. 11. In the illustrated embodiment, the valve seat assembly 10 further includes a sealing member (not shown), such as an O-ring, and the like, disposed within the recess 24. Although the valve seat assembly 10 is shown in FIG. 11, it should be appreciated that the valve seat assembly 100 can be substituted for the valve seat assembly 10 in the valve assembly 200.

Figure 12:
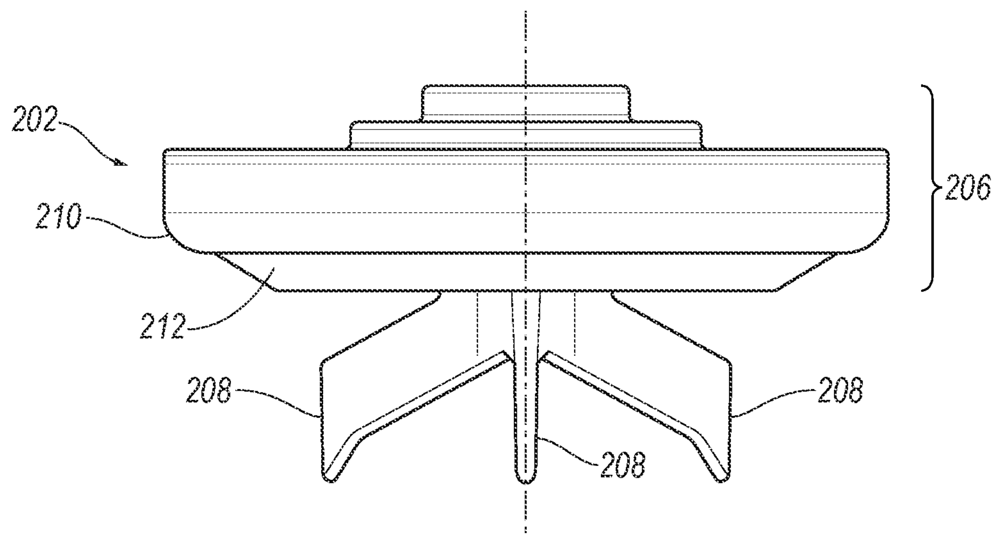
FIG. 12 is an elevational view of a valve according to an embodiment of the invention.

As shown in FIG. 12, the valve 202 includes a head 206 and leg members 208 extending from the head 206. In the illustrated embodiment, the valve 202 has three leg members 208 having equidistant radial spacing. The thickness of each leg member 208 tapers in a direction away from the head 206 to produce laminar fluid flow around the head 206. The valve 202 also includes a sealing member 210 made of a suitable material, such as polyurethane, and the like, and a frustoconical valve seat mating surface 212 for mating with the frustoconical valve mating surfaces 32, 40 of the valve seat assembly 10 when the valve seat assembly 10, 100 is brought into a mating relationship with the valve 202.

The patents and publications referred to herein are hereby incorporated by reference.

Having described presently preferred embodiments the invention may be otherwise embodied within the scope of the appended claims.

What is claimed is:

1. A valve seat assembly for a valve assembly, comprising:

a body including an insert pocket comprising an axially extending inner surface and a radially extending bottom surface; and an insert disposed within the insert pocket of the body, the insert including an axially extending outer surface and a radially extending bottom surface for mating with the axially extending inner surface and the radially extending bottom surface of the body, wherein the axially extending inner surface of the body, when viewed in cross-section, is formed with a non-zero reverse taper angle, $A_4$, for securing the insert within the insert pocket of the body wherein the axially extending outer surface of the insert, when viewed in cross-section, is formed with a non-zero reverse taper angle, $A_5$, and wherein the non-zero reverse taper angle, $A_4$, of the body is greater than the reverse taper angle, $A_5$, of the insert.

2. The valve seat assembly of claim 1, wherein the body further comprises an outer surface, an inner surface, and a frustoconical mating surface formed at an angle, $A_3$, which respect to a plane substantially perpendicular to the central, longitudinal axis, $C_L$, of the valve seat assembly, wherein the insert further comprises a frustoconical mating surface formed at an angle, $A_3$, which respect to a plane substantially perpendicular to the central, longitudinal axis, $C_L$, of the valve seat assembly.

3. The valve seat assembly of claim 2, wherein an outer surface of the body is formed with a taper angle, $A_1$, with respect to the central, longitudinal axis, $C_L$, of the valve seat assembly.

4. The valve seat assembly of claim 1, wherein the body comprises a first portion and a second portion.

5. The valve seat assembly of claim 4, wherein the first portion has a first outer diameter, $D_1$, wherein the second portion has a second outer diameter, $D_2$, and wherein the first outer diameter, $D_1$, is greater in magnitude the second outer diameter, $D_2$.

6. The valve seat assembly of claim 4, wherein the body further comprises a shoulder proximate the first portion.

7. The valve seat assembly of claim 6, wherein the body of the valve seat assembly further comprises an undercut proximate the shoulder.

8. The valve seat assembly of claim 7, wherein the undercut is formed at an angle, $A_2$, with respect to the central, longitudinal axis, $C_L$, of the valve seat assembly.

9. The valve seat assembly of claim 7, wherein the undercut comprises a chamfered surface formed at an angle, $A_2$, with respect to the central, longitudinal axis, $C_L$, of the valve seat assembly.

10. A valve assembly, comprising:

a valve; and a valve seat assembly in reciprocating contact with the valve, the valve seat assembly comprising:

a body including an insert pocket comprising an axially extending inner surface and a radially extending bottom surface; and an insert disposed within the insert pocket of the body, the insert including an axially extending outer surface and a radially extending bottom surface for mating with the axially extending inner surface and the radially extending bottom surface of the body, wherein the axially extending inner surface of the body, when viewed in cross-section, is formed with a non-zero reverse taper angle, $A_4$, for securing the insert within the insert pocket of the body wherein the axially extending outer surface of the insert, when viewed in cross-section, is formed with a non-zero reverse taper angle, $A_5$, and wherein the reverse taper angle, $A_4$, of the body is greater than the reverse taper angle, $A_5$, of the insert.

11. The valve assembly of claim 10, wherein the valve further comprises a head including a frustoconical valve mating surface, and leg members extending from the head.

12. The valve assembly of claim 11, wherein the body further comprises an outer surface, an inner surface, and a frustoconical mating surface formed at an angle, $A_3$, which respect to a plane substantially perpendicular to the central, longitudinal axis, $C_L$, of the valve seat assembly, wherein the insert further comprises a frustoconical mating surface formed at an angle, $A_3$, which respect to a plane substantially perpendicular to the central, longitudinal axis, $C_L$, of the valve seat assembly, and wherein the frustoconical mating surface of the body and the frustoconical mating surface of the insert cooperate with the frustoconical valve mating surface of the valve when the valve seat assembly is brought into a mating relationship with the valve.

13. The valve assembly of claim 12, wherein an outer surface of the body is formed with a taper angle, $A_1$, with respect to the central, longitudinal axis, $C_L$, of the valve seat assembly.

14. The valve assembly of claim 10, wherein the body comprises a first portion and a second portion.

15. The valve assembly of claim 14, wherein the first portion has a first outer diameter, $D_1$, wherein the second portion has a second outer diameter, $D_2$, and wherein the first outer diameter, $D_1$, is greater in magnitude the second outer diameter, $D_2$.

16. The valve assembly of claim 14, wherein the body further comprises a shoulder proximate the first portion.

17. The valve assembly of claim 16, wherein the body of the valve seat assembly further comprises an undercut proximate the shoulder.

18. The valve assembly of claim 17, wherein the undercut is formed at an angle, $A_2$, with respect to the central, longitudinal axis, $C_L$, of the valve seat assembly.

19. The valve assembly of claim 17, wherein the undercut comprises a chamfered surface formed at an angle, $A_2$, with respect to the central, longitudinal axis, $C_L$, of the valve seat assembly.

* * * * *